United States Patent [19]
Alley

[11] Patent Number: 6,067,740
[45] Date of Patent: May 30, 2000

[54] FISHING ROD REEL SEAT ASSEMBLY

[76] Inventor: F. William Alley, 1325 Gebbie Rd., Greensboro, Vt. 05841

[21] Appl. No.: 09/213,978

[22] Filed: Dec. 17, 1998

[51] Int. Cl.[7] .................................................. A01K 87/06
[52] U.S. Cl. .................................................. 43/22; 43/20
[58] Field of Search ............................................ 43/22, 20

[56] References Cited

U.S. PATENT DOCUMENTS

| | | |
|---|---|---|
| 1,339,238 | 5/1920 | Tillman . |
| 4,918,852 | 4/1990 | Yamato . |
| 5,199,207 | 4/1993 | Nakagawa . |
| 5,347,742 | 9/1994 | Ohmura . |

FOREIGN PATENT DOCUMENTS 14542 of 1891 United Kingdom ....................... 43/22

*Primary Examiner*—Jack W. Lavinder
*Attorney, Agent, or Firm*—Wall Marjama Bilinski & Burr

[57] ABSTRACT

A reel seat for a fishing rod includes a hollow tubular body having attached first and second cylindrical foot holders for detachably securing a reel foot thereto. The first cylindrical foot holder is slidably engageable with a threaded end on the tubular body and includes an interior surface having a first arcuate region for receiving a leg of a reel foot having a first size and a second arcuate region for receiving a leg of a reel foot having a second size that is different from the first size. The first foot holder is linearly and rotatably adjustable so as to allow either the first or second arcuate region to be aligned with the second cylindrical foot holder, which is separately and fixedly mounted to the hollow tubular body and has an interior surface capable of receiving the remaining leg of the reel foot of either size.

19 Claims, 3 Drawing Sheets

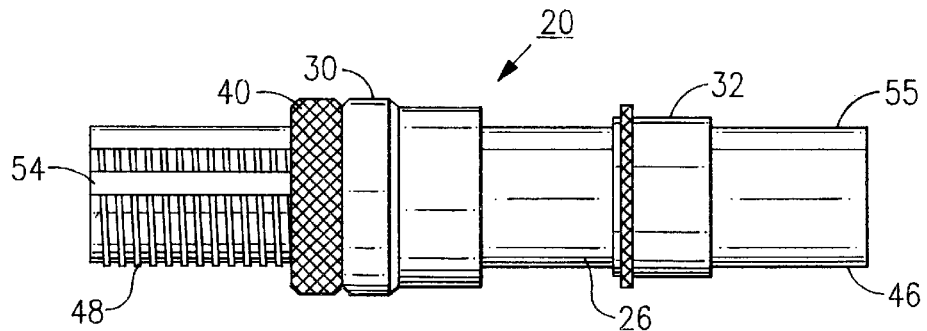
FIG. 17
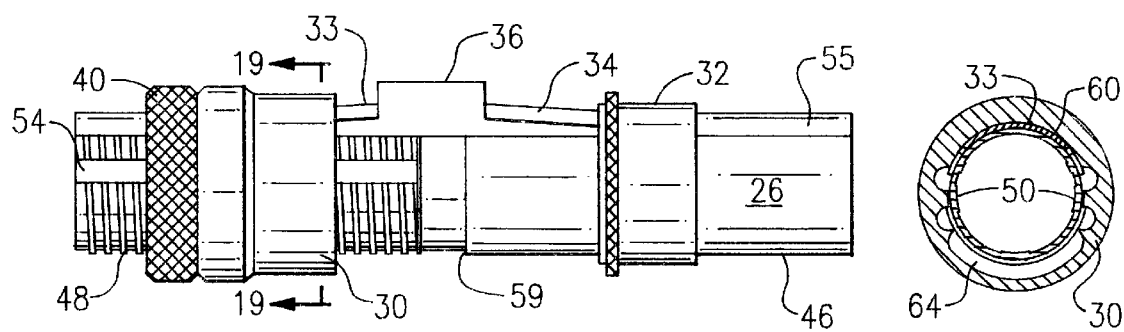 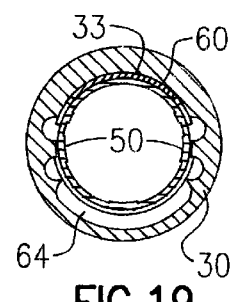
FIG. 18　　　　　　　　FIG. 19
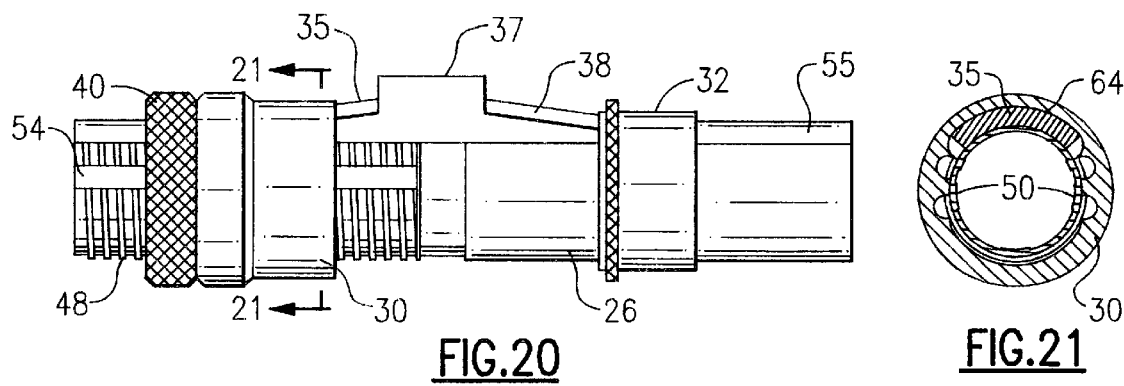 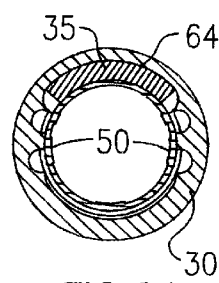
FIG. 20　　　　　　　　FIG. 21

FISHING ROD REEL SEAT ASSEMBLY

FIELD OF THE INVENTION

The present invention relates generally to a reel seat for securing a reel to a fishing rod. More particularly, the present invention relates to a reel seat having an adjustable foot holder which selectively accommodates different sized reel feet.

BACKGROUND OF THE INVENTION

Reel seats have long been used for securing a reel to a fishing rod. Ideally, the reel seat is easily adjustable, thereby permitting the user to remove the reel from the rod with little effort.

U.S. Pat. No. 5,347,742 shows a known reel seat body having an externally threaded end and a fixedly mounted hood which holds a reel foot in place. A slidable hood is provided that opens toward the fixed hood. The seat body includes a step which defines the end of travel of the slidable hood. The fixed hood includes a reel leg-engaging member which is slidably displaceable toward and away from the slidable hood as well as an elastic material for backing up the member.

U.S. Pat. No. 4,918,852 also discloses a typical reel seat including a tubular fixture body having a screw thread, a fixing holder, a pusher which is movable toward or away from the fixing holder, and a threaded ring for operating the movable pusher. In addition, a plurality of locking grooves extend lengthwise of the fixture body. These locking grooves are spaced at predetermined intervals circumferentially of the fixture body. A projection, engageable with one of the locking grooves, restrains the threaded ring from loosening prematurely. As a result, the projection can be changed between engaged and disengaged positions with one of the locking grooves.

While the above-discussed patents show how the industry is striving to make reel seats more reliable and easy to use, there has been no development of reel seats capable of accommodating reel feet of different size. Typically, reel feet have a wide range of lengths and heights. In an effort to make reels compatible with different brands of reel seats, manufacturers have begun to standardize the dimensions of reel feet for particular classes of reels. This standardization has enabled manufacturers to design reel seats capable of accommodating reel feet for a specific class. Despite these standard dimensions, however, fisherman have still been limited to the particular classes of reels that can be used with a given reel seat. For example, a fisherman who fishes small streams and rivers can not switch reels and use the same rod with a larger reel since the reel foot will not fit into the smaller reel seat. Simply put, different types of fishing require different types of reels, and different reels have reel feet of varying dimensions.

Currently, a fisherman has two options with respect to using two different size reels. First, he or she may replace the reel seat before using a different reel with a particular rod. However, replacing a reel seat is one of the most difficult modifications a fly fisherman could undertake. Secondly, he or she may purchase at least two rods with different reel seats; one which accommodates a large reel foot, and another which accommodates a smaller reel foot. This is unduly expensive.

To date, the fishing industry has failed to provide a reel seat capable of accommodating reel feet with different dimensions. Accordingly, fisherman are limited as to reel choice for a given fishing rod.

SUMMARY OF THE INVENTION

An object of the present invention is to provide a reel seat having an adjustable foot holder capable of securing more than one size of reel foot.

Another object of the present invention is to provide a reel seat assembly with foot holders capable of securing reel feet of varying length, height and/or width.

The improved reel seat of the present invention overcomes the disadvantages of the prior art by providing a reel seat for a fishing rod having first and second cylindrical foot holders for detachably securing a reel to the reel seat. The first cylindrical foot holder slidably engages a first outer end of a hollow tubular body and has an interior surface including a first arcuate region for receiving a leg of a reel foot having a first size and a second arcuate region for receiving a leg of a reel foot having a second size that is different from the first size. The second cylindrical foot holder engages a second outer end of the hollow tubular body and has an interior surface capable of receiving the other leg of either reel foot. Advantageously, the arcuate regions of the adjustable first foot holder allow a single reel seat to secure more than one size of reel foot.

Preferably, the interior surface of the second foot holder also includes an arcuate region which in combination with the outer periphery of the foot body allows the remaining leg of either reel foot to be received.

According to yet another feature of the invention, complementary guide members provided on the interior of the first foot holder and the outer surface of the reel seat body maintain alignment between the foot holders and allow quick interchangeability for allowing either reel foot to be attached.

According to still another feature of the invention, the hollow tubular body of the described reel seat assembly includes a plurality of threaded portions at one end, the threads being substantially continuous over a majority of the outer periphery with the exception include a plurality of notches at predetermined intervals and an unthreaded annular portion. The notches are aligned to form at least one linear groove longitudinally along the outer surface of the tubular body for receiving the guide members.

Preferably, an axially displaceable securing member engages the threaded end of the hollow tubular body and urges the first cylindrical foot holder toward the second cylindrical foot holder. This allows the reel foot to be firmly clamped on the reel seat. Preferably, the securing member consists of an adjustable threaded ring or collar having internal threads sized for engaging the external threads to lock the ring to the tubular body.

According to another feature of the invention, the second foot holder is fixed and the first cylindrical foot holder, second foot holder, and threaded ring are all substantially in concentric and axial alignment with the tubular body. Preferably, the first cylindrical foot holder is located between the fixed second foot holder and the threaded ring.

Advantageously, and by accommodating different sized reels on a single rod, the reel seat assembly of the present invention eliminates the need of the fisherman to purchase a plurality of expensive rods.

These and other features of the invention, as well as additional objects, advantages, and other novel features of the invention, will become apparent to those skilled in the art upon reading the following Detailed Description of the Invention which should be read in conjunction with the accompanying drawings.

BRIEF DESCRIPTION OF THE DRAWINGS

The object of the present invention is described, merely by way of example, in the accompanying drawings in which:

FIG. 17 is a side view of the reel seat assembly of FIG. 1;

FIG. 18 is a side view of the reel seat assembly of FIGS. 1 and 17 in engagement with a standard type reel foot;

FIG. 19 is a cross-sectional view taken along line 19—19 of FIG. 18;

FIG. 20 is a side view of the reel seat assembly of FIGS. 1 and 17 in engagement with a spey type reel foot; and FIG. 21 is a cross-sectional view taken along line 21—21 of FIG. 20.

DETAILED DESCRIPTION OF THE INVENTION

In order that the present invention may be more readily understood, the following description is given, merely by way of example, reference being made to the accompanying drawings.

Figure 1:
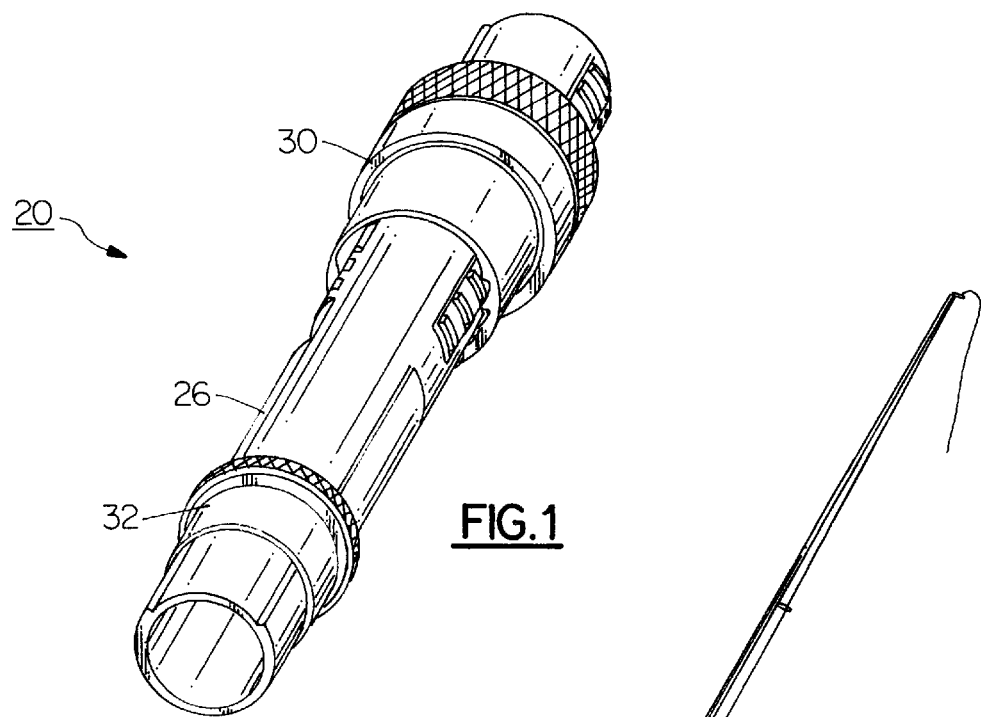
FIG. 1 is a perspective view of a reel seat assembly in accordance with a preferred embodiment of the present invention.
Figure 2:
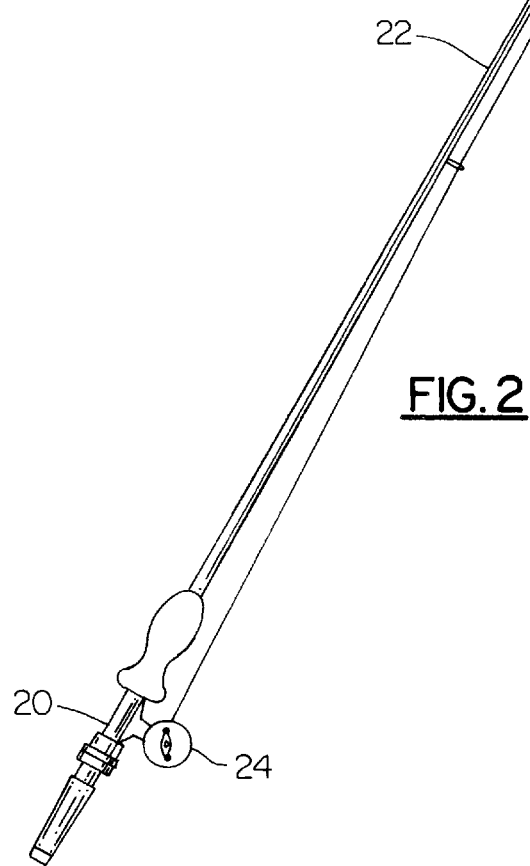
FIG. 2 is a side perspective view of the reel seat assembly of FIG. 1 in a typical position on a fly fishing rod.

Referring first to FIGS. 1 and 2, a reel seat assembly 20 in accordance with a preferred embodiment is used for connecting a reel 24 of a predetermined size to a fly fishing rod 22. The assembly 20 includes a number of components including a hollow tubular body 26 having an outer or exterior surface onto which is mounted a first foot holder 30 and a second foot holder 32, each of which are used, in the manner described below, for detachably securing reel feet 36, 37, FIGS. 18, 20, of differing size. Preferably, the axial position of the first foot holder 30 can be adjusted axially and linearly, while the second cylindrical foot holder 32 is axially fixed. The reel seat assembly 20 also includes a securing member 40. Preferably, the first foot holder 30, second foot holder 32, and securing member 40 are all substantially in concentric axial alignment with the tubular body 26. Moreover, the first foot holder 30 is located between the second foot holder 32 and the securing member 40. The reel seat assembly 20 can be made of any known material. For instance, aluminum, gold, nickel, silver, stainless steel, nickel silver alloy, plastic and wood are typically used. Each of the components of an assembly 20 of a preferred embodiment will be now be described individually and in greater detail.

Figure 3:
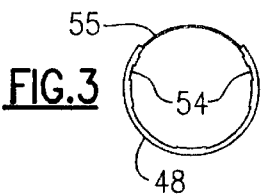
FIG. 3 is a side view of the hollow tubular body of the reel seat assembly of FIG. 1.
Figure 5:
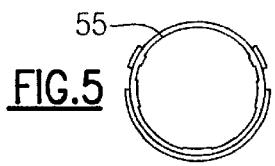
FIGS. 4 and 5 are opposing end views of the hollow tubular body.
Figure 4:
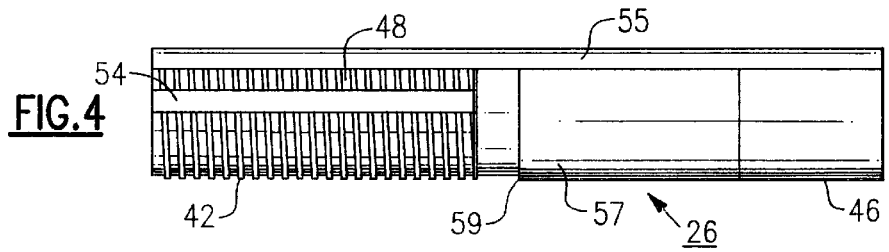
Figure 6:
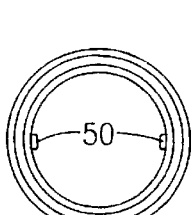
FIGS. 6 and 8 are opposing end views of a first cylindrical foot holder which is useful in the reel seat assembly of FIG. 1.
Figure 7:
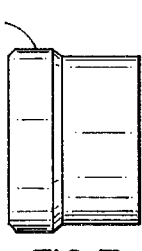
FIG. 7 is a side view of the first cylindrical foot holder of FIGS. 6 and 8.

As shown in FIGS. 3–5, the hollow tubular body 26 of the present embodiment includes a pair of ends; namely, a threaded first end 42 and an opposing second end 46. The first end 42 includes an threaded portion 48 having a plurality of external threads extending substantially continuously about a major portion of the outer periphery of the tubular body 26, with the exception of a pair of linear grooves 54, (only one groove being shown in FIG. 4) disposed at predetermined intervals, each groove extending longitudinally over the axial length of the threaded portion 48. A remaining unthreaded annular portion 55 extends over the entire axial length of the tubular body 26 and, as described in greater detail below, is used in combination with the first foot holder 30 and second foot holder 32 to define reel foot retaining areas. The remainder 57 of the exterior surface of the second end 46 of the tubular body 26 is raised to approximately the same dimension as the threaded portion 46 and forms an annular shoulder 59, creating an axial stop for the linearly and rotatably adjustable first foot holder 30, also as described below.

As shown in FIGS. 6–9, the first foot holder 30 is a cylindrical member having an interior surface 58 including a pair of spaced arcuate regions 60, 64. Each arcuate region 60, 64 preferably extends over only a portion of the interior circumference and, according to this embodiment, is substantially diametrically opposed with respect to one another.

In order to fit differently sized reel feet 36, 37, FIGS. 18, 20, each arcuate region 60, 64 is differently sized. More particularly, the radius of curvature of the first arcuate region 60 is less than the radius of curvature of the second arcuate region 64. In the described embodiment, the radius of curvature of the first arcuate region 60 is between about 0.345 inches and 0.375 inches, whereas the radius of curvature of the second arcuate region 64 is between about 0.430 inches and 0.450 inches. Advantageously, these regions 60, 64 allow a singular reel seat assembly 20 to secure more than one size of reel foot, 36, 37, FIGS. 18, 20, as described more completely below. Each of the arcuate regions 60, 64 are approximately the same size circumferentially, and are preferably diametrically opposed to one another.

Though specific radii of curvature are specified according to the described embodiment, it is conceivable to utilize other convenient sizes. For example, the first arcuate region could utilize radii of curvature in the range of about 0.300–0.500 inches, while the second arcuate region could utilize a range of 0.300–0.600 inches. Still other variations could easily be realized depending on the reel foot.

In addition, the interior surface 58 of the first foot holder 30 further includes a pair of complementary guide members 50. In the described embodiment, shown most clearly in FIGS. 3 and 8, the complementary guide members 50 are defined as a pair of protrusions 86 projecting outwardly from the interior surface 58, each of which being sized and spaced relative to one another so as to fit the linear grooves 54 of the threaded portion 48 of the tubular body 26 when the first foot holder 30 is attached thereto. As noted above, the guide members 50 ensure proper alignment of either the first or second arcuate regions 60, 64 relative to a reel foot of interest, depending on the circumferential orientation of the first foot holder 30, and also prevent undesired rotation of the first foot holder 30.

Alternately, the complementary alignment members could be defined by protrusion(s) (not shown) formed on the outer surface of the tubular body 26 with a groove (not shown) formed on the interior surface 58 of the first foot holder 30.

Referring to FIGS. 10–13, the second foot holder 32 is also a hollow cylindrical member which preferably and fixedly engages the second end 46 of the hollow tubular body 26, FIG. 4, at a predetermined axial distance. Like the first foot holder 30, the second foot holder 32 has an interior surface 68, a portion of which is inwardly recessed. More specifically, the inwardly recessed portion 69 includes a radius of curvature which is greater than the remainder of the interior surface 68 and extends over substantially the axial length of the foot holder 32. For reasons which will become apparent below, the annular region 69 is sized circumferentially to coincide with similar circumferential spans of the first and second arcuate regions 60, 64, FIG. 8, of the first foot holder 30, FIG. 8, and the unthreaded annular portion 55, FIG. 4, of the tubular body 26, FIG. 4.

Figure 8:
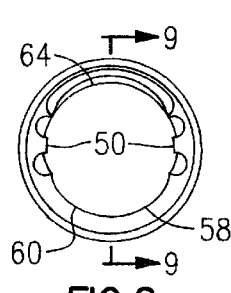
Figure 9:
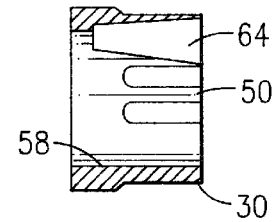
FIG. 9 is a sectional view of the first cylindrical foot holder of FIGS. 6, 7, and 8.
Figure 10:
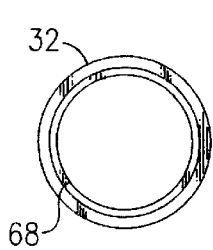
FIGS. 10 and 12 are opposite end views of a second cylindrical foot holder which is useful in the reel seat assembly of FIG. 1.
Figure 11:
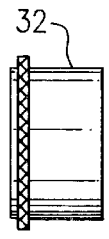
FIG. 11 is a side view of the second cylindrical foot holder of FIGS. 10 and 12.
Figure 12:
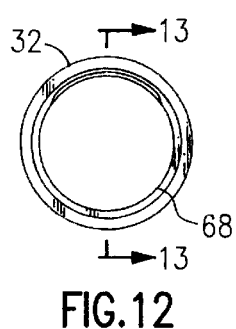
Figure 13:
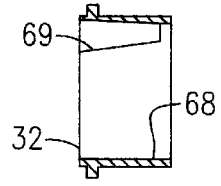
FIG. 13 is a cross sectional side view of the second cylindrical foot holder of FIG. 11.
Figure 14:
FIG. 14 is a side view of an axially displaceable securing member of the reel seat assembly of FIG. 1.
Figure 15:
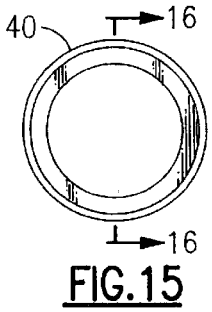
FIG. 15 is a top view of the securing member of FIG. 14.
Figure 16:
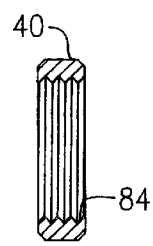
FIG. 16 is a sectional view of the axially displaceable securing member of FIGS. 15 and 16.

FIGS. 14–16 illustrate the axially displaceable securing member 40 which, in brief, engages the first outer end 42, FIG. 4, of the hollow tubular body 26, FIG. 4, and urges the adjustable first foot holder 30, FIG. 8, toward the fixed second foot holder 32, FIG. 11. In the present embodiment, the securing member 40 is an adjustable, threaded ring or collar having a set of internal threads 84 sized for engaging the threaded portion 48 of the tubular body 26. According to the present embodiment, the outer surface of the securing member 40 is knurled.

A mode of operation of the above described reel seat assembly 20 will now be described in detail with reference to FIGS. 17 through 21. For purposes of discussion, the mounting of a first standard size reel foot 36 having a pair of legs 33 and 34 will be described first in accordance with FIGS. 17–19.

Initially, the second foot holder 32 is fixedly attached to the second end 46 of the tubular body 26 and is aligned such that the annularly recessed portion 69 of the interior surface 68 thereof is aligned substantially with the unthreaded portion 55 of the tubular body 26. The first foot holder 30 slidably engages the first outer end 42 of the hollow tubular body 26 by aligning the linear grooves 54 formed in the threaded portion 48 with the guide members 50 on the interior surface 58 of the foot holder. As will be apparent, two positions, 180 degrees apart can be realized. For purposes of fitting the standard sized reel foot 36, the first arcuate region 60 is aligned with the unthreaded annular portion 55 and the inner annular portion 69 of the second foot holder 32. The first foot holder 30 is then axially moved over the threaded portion 48 until a suitable spacing is realized between the first and second foot holders 30, 32. Each of the legs 33, 34 of the standard size reel foot 36 are then placed into the retaining areas defined by the first arcuate region 60 and the unthreaded portion 55 and the recessed portion 69 and unthreaded portion 55, respectively. The first foot holder 30 is then locked into position by engaging the internal threads of the securing member 40 with the threaded portion 48 and axially threading the securing member into contact with the first foot holder.

Similarly, the above assembly 20 can alternately be configured to support a larger spey type reel foot 37, having leg segments 35 and 38, as shown in FIGS. 20, 21.

To attach the larger spey-type reel foot 37, the securing member 40 is first loosened allowing the legs 33, 34, FIG. 18, of the reel foot 36, FIG. 18 to be removed from each foot holder 30, 32. The first foot holder 30 can then either be shifted in either axial direction relative to the threaded portion 48 until the guide members are no longer in contact with the linear grooves 54, allowing the first foot holder 30 to be freely rotatable. The foot holder 30 is then rotated approximately 180 degrees, to the position of FIG. 20 in which the second arcuate region 64 is in axial alignment with the unthreaded portion 55 and the annular portion 69, FIG. 13, of the fixed second foot holder 32, FIG. 13. The first foot holder 30 is then moved over the threaded portion 48 toward the second foot holder 32 until a suitable spacing is achieved. The legs 35, 38 of the spey type reel foot 37 are then placed in the spaces defined by the second arcuate region 64 and the unthreaded portion 55 which is larger than the space previously defined for the standard type reel 36, FIG. 18, and the space previously defined by the recessed portion 69 of the second foot holder 32 and the unthreaded portion 55, which is adequately sized to fit either leg 34, 38. The securing member 40 is then cinched to the first foot holder 30 to complete the assembly 20.

While the present invention has been particularly shown and described with reference to the preferred mode as illustrated in the drawings, it will be understood by one skilled in the art that various changes in detail may be effected therein without departing from the spirit and scope of the invention as defined by the claims.

I claim:

1. A reel seat assembly for receiving a rod and for detachably securing a reel foot of varying size, said reel foot having a pair of legs, said assembly comprising:
   a tubular body;
   a first cylindrical foot holder slidably engaging a first outer end of said tubular body, said first foot holder having an interior surface including a first arcuate region for selectively receiving a leg of a first reel foot having a first size, and a second arcuate region for selectively receiving a leg of a second reel foot having a second size different from said first size; and
   a second cylindrical foot holder fixedly engaging a second outer end of said hollow tubular body, said second foot holder including a reel foot receiving portion for receiving the other leg of either of the reel feet;
   said first foot holder having means for permitting said first and second arcuate regions to be selectively rotated to a predetermined circumferential position axially aligned with the reel foot receiving portion of said second cylindrical foot holder.

2. The reel seat assembly of claim 1, further comprising:
   complementary guide members formed on an outer surface of said hollow tubular body and on said first cylindrical foot holder to maintain alignment, in the axial direction of said reel seat, of said arcuate region of said second cylindrical foot holder and one of said first and second arcuate regions of said first cylindrical foot holder.

3. The reel seat assembly of claim 2, wherein said complementary guide members comprise at least one protrusion formed on one of said outer surface of said hollow tubular body and said interior surface of said first cylindrical foot holder, and at least one slot formed in said interior surface of said first cylindrical foot holder and said outer surface of said hollow tubular body, respectively.

4. The reel seat assembly of claim 2, wherein said hollow tubular body includes a plurality of external threads along an outer axial portion thereof.

5. The reel seat assembly of claim 4, wherein said external threads are noncontinuous over at least a radial portion thereof, said noncontinuous portions forming at least one linear groove extending longitudinally along the outer surface of said body.

6. The reel seat assembly of claim 5, wherein said complementary guide members include at least one protrusion of the interior surface of said first cylindrical foot holder, said at least one protrusion slidably interacting with a corresponding linear groove formed on the outer surface of said body, said guide members ensuring proper alignment and preventing rotation of said first cylindrical foot holder out of the predetermined circumferential position.

7. The reel seat assembly of claim 4, including an axially displaceable securing member for engaging said first outer end of said hollow tubular body and urging said first cylindrical foot holder toward said second cylindrical foot holder to clamp the reel foot firmly on said reel seat, wherein said axially displaceable securing member comprises an adjustable, threaded ring having internal threads threadedly fitted onto said external threads of said body for providing locking engagement therewith.

8. The reel seat assembly of claim 7, wherein said first cylindrical foot holder, said second foot holder, and said securing member are all substantially in concentric axial alignment with said hollow cylindrical body and said first cylindrical foot holder is located between said second cylindrical foot holder and said securing member.

9. The reel seat assembly according to claim 1, wherein the radius of curvature of said first arcuate region is less than the radius of curvature of said second arcuate region.

10. The reel seat assembly according to claim 1, wherein said first and second arcuate regions are diametrically opposed to one another.

11. The reel seat assembly according to claim 1, wherein the radius of curvature of the first arcuate region is in the range of about 0.300 inches to about 0.500 inches.

12. The reel seat assembly according to claim 11, wherein the radius of curvature of said first arcuate region is in the range of about 0.345 inches to about 0.375 inches.

13. The reel seat assembly according to claim 1, wherein the radius of curvature of the second arcuate region is in the range of about 0.300 inches to about 0.600 inches.

14. The reel seat assembly according to claim 13, wherein the radius of curvature of the second arcuate region is in the range of about 0.300 inches to about 0.600 inches.

15. A method for attaching reel feet of varying size to a reel seat assembly of a fly fishing rod, said method comprising the steps of:

attaching a first cylindrical foot holder over one end of a hollow tubular body of said reel seat assembly, said first foot holder having an interior surface having first and second circumferentially spaced arcuate regions, said first arcuate region having a radius of curvature which is less than the radius of curvature of the second arcuate region;

rotating said one of said first and second arcuate regions into alignment with a reel foot receiving area of a second cylindrical foot holder fixedly attached to the other end of said hollow tubular body; and attaching respective legs of a first reel foot into said aligned arcuate region of said first cylindrical foot holder and the reel foot receiving area of the second cylindrical foot holder.

16. The method as recited in claim 15, including the steps of removing the first reel foot and rotating the first cylindrical foot holder until the other of said first and second arcuate regions is aligned with said reel foot receiving area to allow a second reel foot of a differing size to be attached to said assembly.

17. The method as recited in claim 16, wherein the outer surface of said hollow tubular body includes a threaded portion having a pair of longitudinal grooves formed therein, said rotating steps including the step of aligning guide members provided on the interior surface of said first foot holder with said grooves to align said either of said arcuate regions with said reel foot receiving area of the second foot holder.

18. The method as recited in claim 17, wherein said rotating steps include the additional steps of:

axially moving said first foot holder in a first direction until said guide members exceed the length of travel of said grooves;

rotating said first foot holder until the other arcuate region is aligned with the reel foot receiving area; and axially moving said first foot holder in a second direction which is opposite said first direction until said guide members reengage said grooves to prevent rotation thereof.

19. A reel mount for a fishing rod comprising:

a hollow tubular body having a pair of opposing ends, one of said ends being threaded; and a first cylindrical foot holder engageable with the threaded end of said tubular body and having an interior surface including a pair of diametrically opposed arcuate regions, each of said arcuate regions having a different radius of curvature which are selectively alignable with a predetermined circumferential position of said tubular body, in which the selective alignment of each of said arcuate regions defines first and second receiving areas sized for receiving the legs of reel feet of differing sizes.

* * * * *